United States Patent [19]
Brownfield et al.

[11] Patent Number: 5,609,232
[45] Date of Patent: Mar. 11, 1997

[54] ELECTROMAGNETIC CLUTCH WITH PERMANENT MAGNET RETURN MECHANISM

[75] Inventors: Jerry A. Brownfield, Minneapolis; Lowell M. Anderson; Steven C. Eberly, both of Bloomington, all of Minn.

[73] Assignee: Thermo King Corporation, Minneapolis, Minn.

[21] Appl. No.: 586,096

[22] Filed: Jan. 16, 1996

[51] Int. Cl.⁶ .......................... F16D 27/01; F16D 27/112
[52] U.S. Cl. .................... 192/84.9; 192/209; 192/84.96; 192/84.3
[58] Field of Search .................. 192/84 A, 84 C, 192/84 PM, 101, 200, 207, 209

[56] References Cited

U.S. PATENT DOCUMENTS

| | | |
|---|---|---|
| 2,105,188 | 1/1938 | Guy ........................................ 192/209 X |
| 2,962,144 | 11/1960 | Heinemann et al. .............. 192/84 PM |
| 3,446,321 | 5/1969 | Nyman . |
| 3,642,104 | 2/1972 | Schafer . |
| 3,842,378 | 10/1974 | Pierce ................................. 192/84 PM |
| 4,566,574 | 1/1986 | Marshall . |
| 4,643,091 | 2/1987 | Fairey . |
| 5,115,898 | 5/1992 | Lehle et al. . |
| 5,119,918 | 6/1992 | Pardee . |
| 5,252,874 | 10/1993 | Viegas . |

*Primary Examiner*—Richard M. Lorence

[57] ABSTRACT

An improved electromagnetic clutch is provided with a permanent magnetic return mechanism. The clutch includes a rotor connected to a driven device, such as a refrigerant compressor, a flywheel connected to a driving device such as an internal combustion engine, and a contact plate assembly for transmitting torque between the flywheel and the rotor when moved from a disengagement to an engagement position by an electromagnet. Permanent magnet assemblies are used to bias the contact plate assembly into a non-engagement position when the electromagnet is deactuated. The use of permanent magnets in lieu of resilient mechanical components such as springs to bias the contact plate assembly into a return position substantially extends the service life of the clutch when it is used in conjunction with a prime mover such as a diesel engine, whose output is accompanied by momentary spikes of high torque.

15 Claims, 4 Drawing Sheets

ELECTROMAGNETIC CLUTCH WITH PERMANENT MAGNET RETURN MECHANISM

BACKGROUND OF THE INVENTION

This invention generally relates to electromagnetic clutches, and is particularly concerned with an improved clutch having a permanent magnet return mechanism for avoiding damage from torque oscillations.

In transport refrigeration systems, it is common to drive the refrigerant compressor from one of two available prime movers, including a diesel internal combustion engine, and a stand-by electric motor. A clutch is used to engage and disengage the refrigerant compressor from the diesel engine. In the past, centrifugal type clutches have been used for this purpose. However, in order to reduce the level of noise associated with the operation of the refrigeration system, it has been desirable in recent years to lower the operational speed of the engine. Such a lowering of operating speed renders the use of a centrifugal clutch impractical. Thus, the use of electromagnetic clutches instead of centrifugal clutches is becoming more common.

Unfortunately, the torque output of a diesel engine is variable due to the operating characteristics of such devices. For example, for a diesel engine of the type used to run a transport refrigeration system, the average torque produced might be on the order of 40 ft/lb. However, such an output may be accompanied by momentary "spikes" of torque on the order to 300 ft/lb, particularly if the diesel engine is operated at a low rotational speed. Such torsional "spikes" are capable of damaging the mechanical linkage between the flywheel of the clutch and the contact plate assembly that engages the clutch rotor.

To prevent such damage from occurring between the flywheel and the contact plate assembly, resilient linkage components have been used in the prior art. For example, in U.S. Pat. No. 5,252,874 (also assigned to Thermo King Corporation) the flywheel and the contact plate assembly are interlinked by means of a system of pins that are slidably movable in resilient bushings. The linkage disclosed in this patent further uses compression springs to bias the contact plate assembly into a non-engagement position with respect to a rotor which in turn is connected to the shaft of the compressor. When the electromagnet of the clutch is actuated, the bias afforded by the compression springs is overcome, and the contact plate assembly engages the rotor of the clutch so that power is transmitted from the output shaft of the diesel engine to the input shaft of the compressor.

While the use of resilient components in the linkage between the flywheel and contact plate assembly has been found to greatly extend the life time of the linkage, the applicants have observed that it does not completely insulate the linkage from damage caused by torsional spikes. In particular, the applicants have observed that the compression springs used to return the contact plate assembly into a non-engagement position may fail after several thousand service hours. Such failure is substantially unexpected, as it was thought that the inherent resiliency of the compression springs would isolate them from such failure.

Clearly, there is a need for an improved electromagnetic clutch having a linkage between the contact plate assembly and the flywheel which is better able to endure a power input accompanied by sharp spikes of torque of the type frequently generated by diesel engines. Preferably, the design of the improved linkage could be easily incorporated into the design of prior art devices such as that disclosed in U.S. Pat. No. 5,252,874.

SUMMARY OF THE INVENTION

Generally speaking, the invention is an improved electromagnetic clutch having a rotor connected to a driven device, a rotatable member such as a flywheel connected to a driving device which may be a diesel engine, and a contact plate assembly for transmitting torque between the flywheel and the rotor when moved from a disengagement to an engagement position by an electromagnet, wherein the improvement comprises a magnetic biasing means formed from at least one permanent magnetic assembly for biasing the contact plate assembly into a disengagement position and for allowing the flywheel to oscillate circumferentially relative to the contact plate assembly in response to torsional oscillations in the output of the diesel engine.

Preferably, the magnetic biasing means includes a plurality of permanent magnet assemblies, each of which is formed from a permanent magnetic surrounded by a cup of ferromagnetic material which concentrates the field of the magnet thereby increasing its gripping force. Each of the permanent magnet assemblies is spaced around the periphery of the contact plate assembly. The flywheel may be formed from a ferromagnetic material such that the permanent magnet pulls the contact plate assembly toward the flywheel and out of engagement with the rotor of the clutch until the electromagnet overcomes the attractive force of the permanent magnets.

Alternatively, the magnetic biasing means may include at least one pair of opposing permanent magnet assemblies. In this embodiment, the periphery of the contact plate assembly is captured in a U-shaped flange provided around the periphery of the flywheel. Two opposing permanent magnet assemblies are located on the flange of the flywheel and the periphery of the contact plate assembly, respectively, with like magnetic poles facing one another. The resulting repulsive magnetic force biases the magnetic contact plate assembly toward the flywheel and out of engagement with the rotor. A plurality of such opposing pairs of magnetic assemblies may be placed around the flange of the flywheel and the periphery of the contact plate assembly to insure the application of a uniform biasing force on the contact plate assembly. While this second embodiment employs more permanent magnets, it has more advantageous biasing characteristics than the first embodiment in that the magnetic biasing force is at its strongest when the electromagnet is deactuated to allow the contact plate assembly to disengage from the rotor.

In both embodiments the balance of the linkage between the flywheel and the contact plate assembly is advantageously formed from a plurality of pins mounted in the flywheel that slidably extend into resilient bushings mounted around the contact plate assembly. The pins allow axial movement and the transmission of torque between these components, while the resilient bushings prevent this linkage from being damaged as a result of torsional spikes accompanying the output of the diesel engine.

The invention has the effect of greatly extending the service life of the electromagnetic clutch since there are no compression springs used to return the contact plate assembly into a non-engagement position. The invention is also easy to incorporate into existing electromagnetic clutch designs.

BRIEF DESCRIPTION OF THE SEVERAL FIGURES

Figure 1:
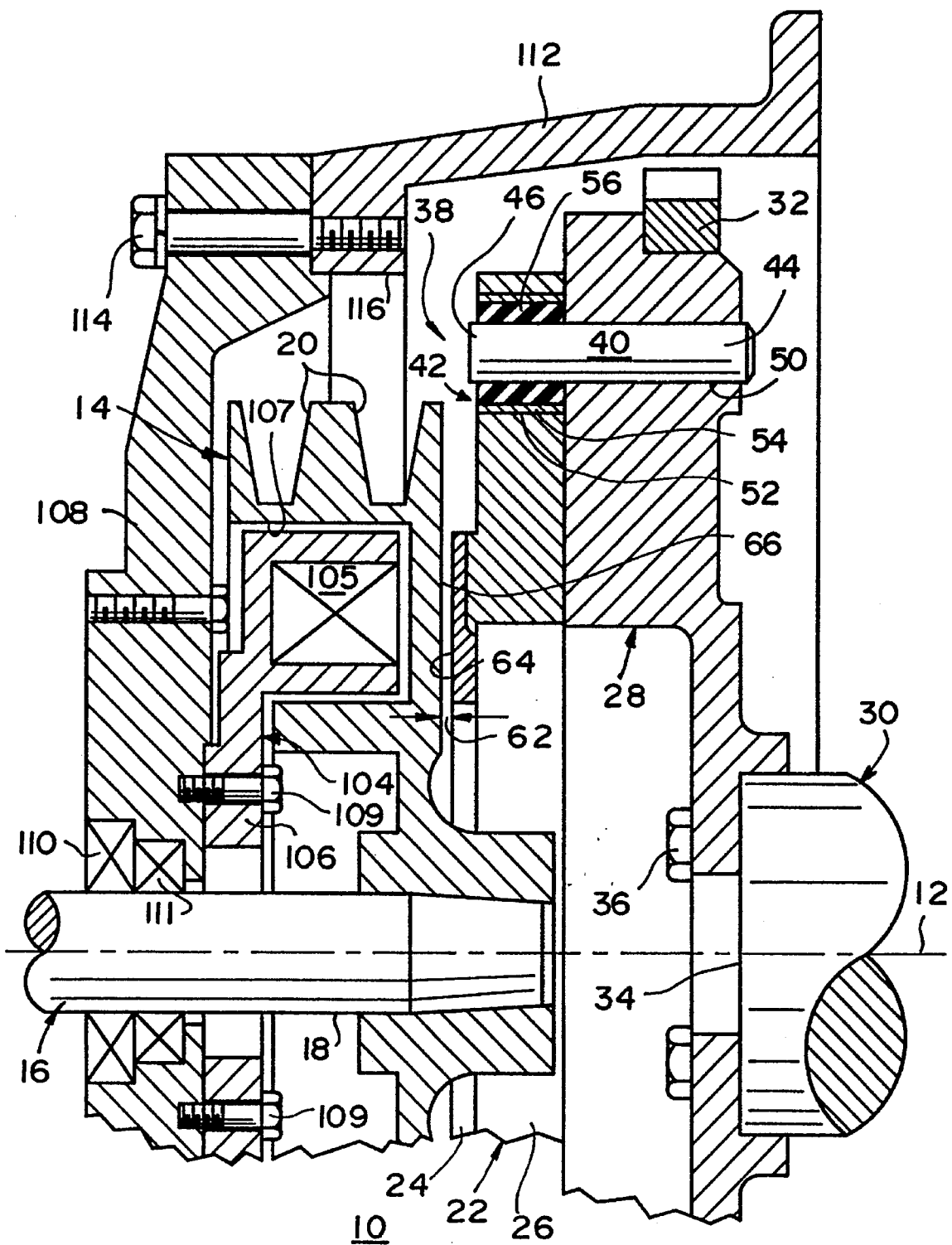
FIG. 1 is a partial cross-sectional side view of the improved electromagnetic clutch of the invention illustrating the flywheel and contact plate assembly as it would appear along the section 1—1 of FIG. 3.
Figure 2:
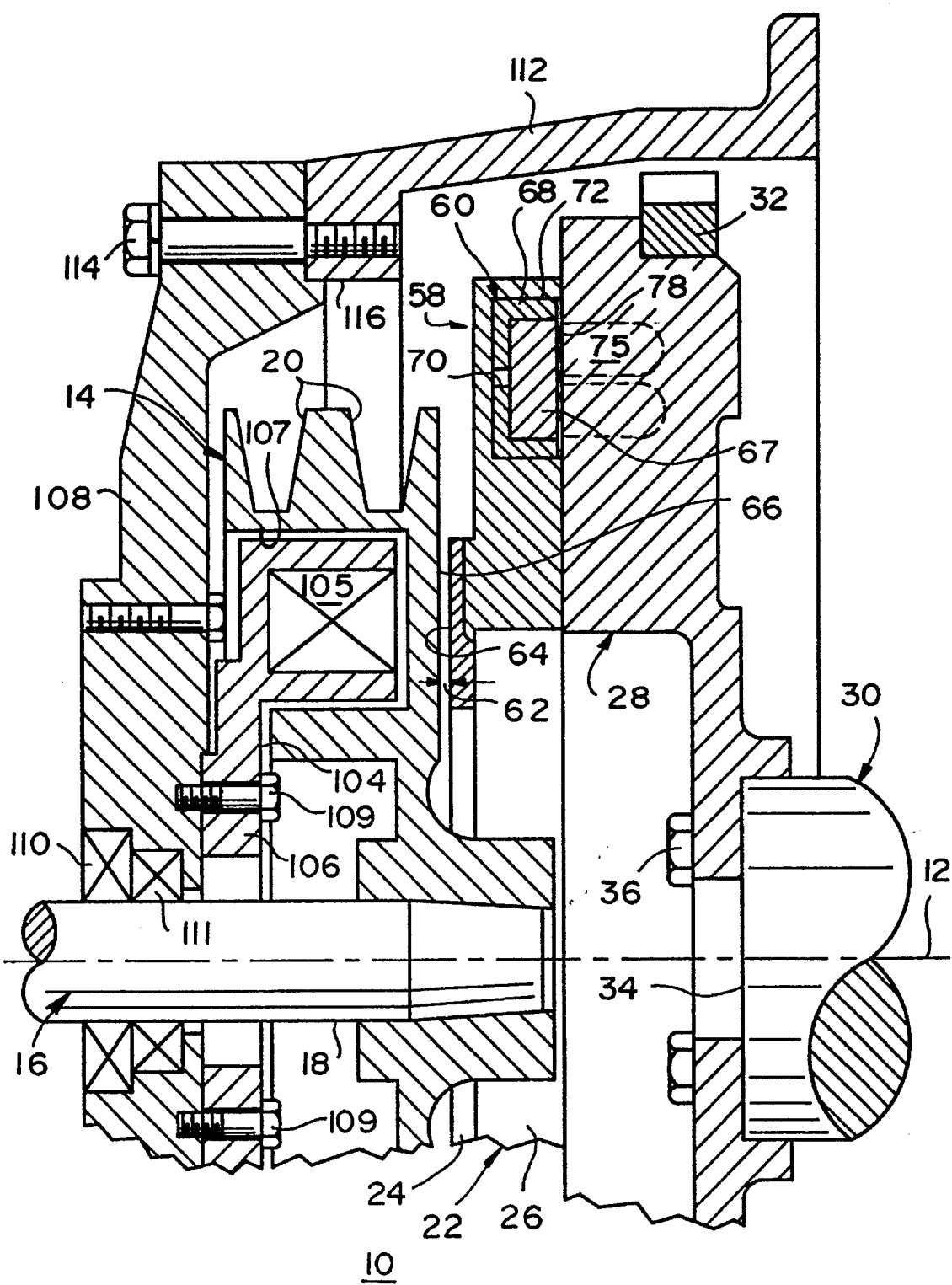
FIG. 2 is also a partial cross-sectional side view of the electromagnetic clutch of the invention illustrating the flywheel and contact plate assembly as it would appear along the section line 2—2 in FIG. 3.
Figure 3:
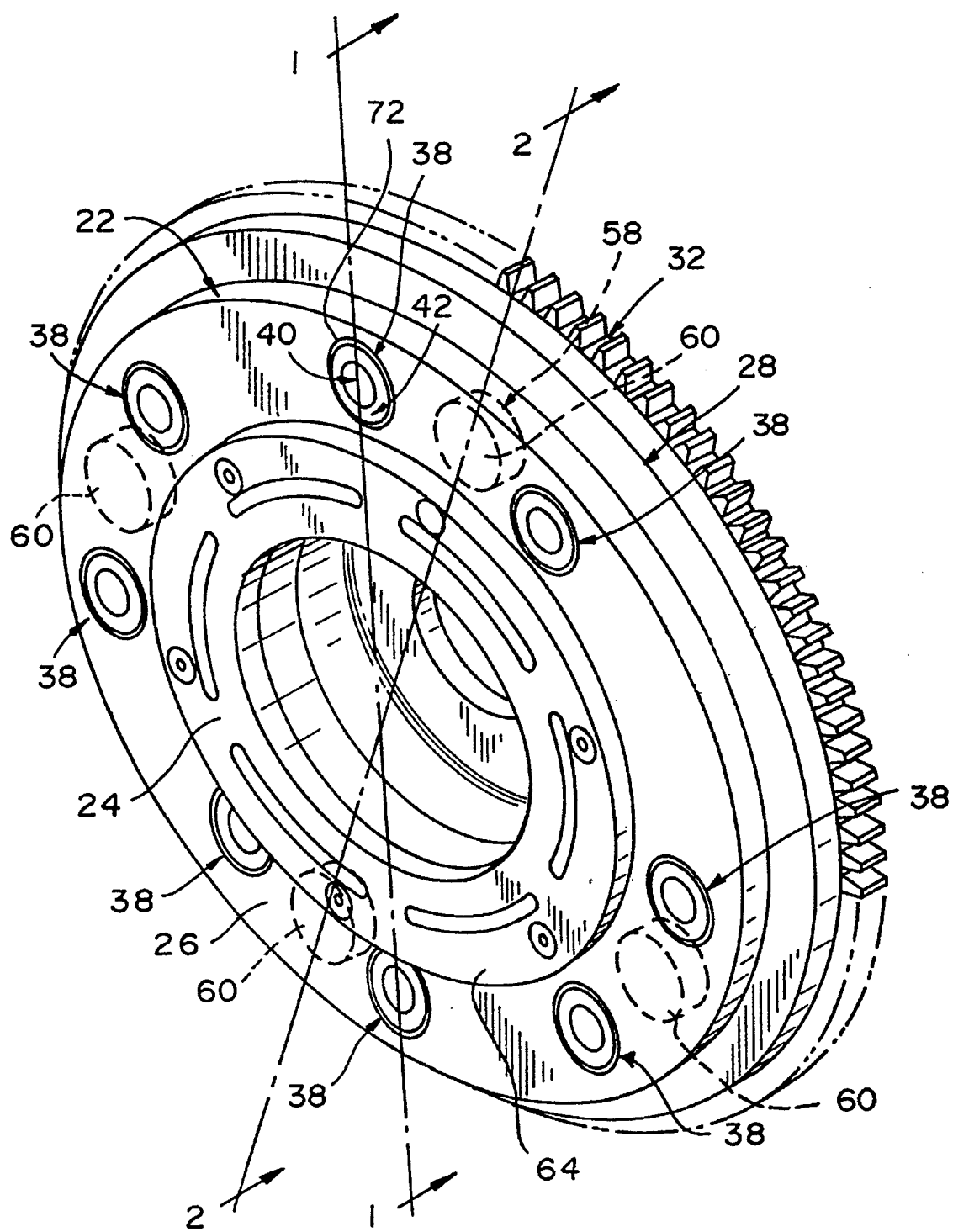
Figure 4:
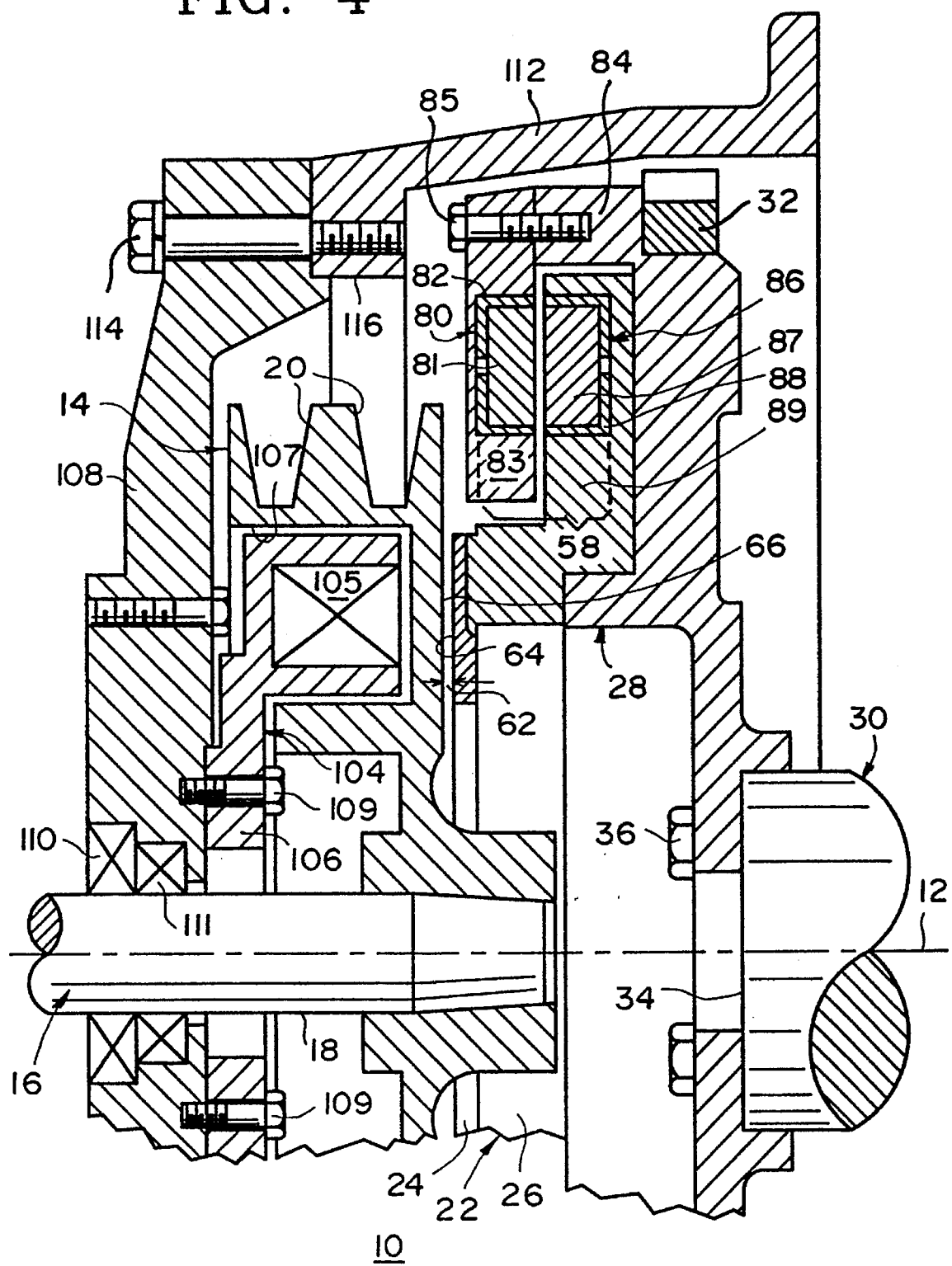

FIG. 3 is a perspective view of the contact plate assembly and flywheel of the improved electromagnetic clutch illustrated in FIGS. 1 and 2, and FIG. 4 is a partial cross-sectional side view of an alternative embodiment of the electromagnetic clutch of the invention which utilizes a plurality of pairs of opposing magnet assemblies instead of single magnet assemblies to bias the contact plate assembly into a non-engagement position with respect to the rotor of the clutch.

DETAILED DESCRIPTION OF THE PREFERRED EMBODIMENTS

With reference now to FIG. 1, wherein like numerals designate like components throughout all of the several Figures, the improved electromagnetic clutch 10 of the invention is symmetrical about a central axis 12. Accordingly, only that portion of the clutch 10 on the upper side of axis 12 is shown in full. Electromagnetic clutch 10 includes a ferromagnetic rotatable member or rotor 14 which is connected to a driven device 16, such as a refrigerant compressor. Rotor 14 is fixed, such as with a keyway (not shown), to an input shaft 18 of the refrigerant compressor 16. Input shaft 18 has a longitudinal rotational axis which coincides with the axis 12. Rotor 14 has a grooved outer periphery 20 which enables it and the refrigerant compressor 16 connected thereto to be driven by a first prime mover, such as an electric motor, by way of a drive belt (not shown). The electromagnetic clutch 10 enables the rotor 14 and the refrigerant compressor 16 to be driven by a second prime mover 30, which may be a diesel engine.

Electromagnetic clutch 10 includes a contact plate assembly 22 having a ferromagnetic contact plate 24, and an aluminum adapter plate 26. Adapter plate 26 adapts the contact plate assembly 22 for mounting relative to a flywheel 28 associated with the second prime mover 30. The flywheel 28 may have a ring gear 32 mounted thereon. Flywheel 28 is suitably fixed to an output shaft 34 of the second prime mover 30 by bolts 36. The rotational axis of the output shaft 34 coincides with the central axis 12.

With reference now to FIGS. 1 and 3, the contact plate assembly 22 is slidably mounted to the flywheel 28 by way of a plurality of resilient mounting means 38. Each of the resilient mounting means 38 includes a cylindrical dowel pin 40 that is slidably movable within a central opening in a bushing 42. Specifically, each of the cylindrical dowel pins 40 includes a first end 44 that is securely mounted in an opening 50 in the flywheel 28, and a second end 46 that slidably extends into the central opening in the bushing 42. The bushing 42 is secured in a circular opening 52 present in the periphery of the adapter plate 26. Additionally, the bushing 42 of each of the resilient mounting means 38 is formed from an outer metallic tubular member 54 that circumscribes an inner resilient tubular member 56 which may be formed, for example, from an elastomeric material. The resiliency of the inner resilient tubular member 56 accommodates torsional oscillations applied to the dowel pins 40 and flywheel 28 as a result of the operating characteristics of the second prime mover 30 when this mover is a diesel engine. A more detailed discussion is given of the resilient mounting means 38 in U.S. Pat. No. 5,252,874, the text of which is hereby expressly incorporated by reference herein.

With reference now to FIG. 2 and 3, the improved clutch 10 of the invention further comprises a magnetic biasing means 58 for biasing the contact plate assembly 22 in a non-engagement position with respect to the rotor 14. To this end, the biasing means 58 includes a plurality of magnetic assemblies 60 mounted around the outer periphery of the adapter plate 26 of the assembly 22. The magnetic assemblies 60 and adapter plate 25 pull the back surface of the contact plate assembly 22 into engagement with the front surface of the flywheel 28 in order to create an air gap 62 between the flat major engagement face 64 of the contact plate 24, and the flat major face 66 of the rotor 14. In the preferred embodiment, air gap 62 is between 0.0020 and 0.0050 inches. Each of the magnetic assemblies 60 includes a cylindrical permanent magnet 67 secured within a steel mounting cup 68. The steel mounting cup 68 of each assembly 60 is in turn mounted in a circular opening 72 in the aluminum adapter plate 26. The mounting cup 68 not only helps to mount the relatively brittle material forming the magnet 67 in the adapter plate 26; it further serves to focus the lines of magnetic flux emanating from the permanent magnet 67 so as to increase its grip on the magnetically attractive material forming the flywheel 28. Mounting cup 68 further includes a cup aperture 70 for facilitating the removal of the magnet 67 in the event that disassembly is required. The magnetic biasing means 58 further includes a magnetic portion 75 of the flywheel 28 located in direct opposition to the permanent magnetic 67 of each of the assemblies 60. Preferably, the entire flywheel 28 is formed from a ferromagnetic material so that all of it may be magnetically attracted by a permanent magnet. However, it would also be possible to construct the flywheel 28 so that only the portions in opposition to the magnetic assembly 60 were formed from a magnetically attractive material. It is important to note that a small gap 78 approximately 0.0050 inches in width is left between the face of the permanent magnet 67 and mounting cup 68, and the opposing surface of the flywheel 28. Such a small gap 78 helps to insure that the permanent magnet 67 does not attract and grip the flywheel 75 to an excessive degree.

FIG. 4 illustrates an alternative embodiment of the invention wherein the magnetic biasing means 58 comprises a pair of opposing magnetic assemblies 80 and 86 which mutually repel one another. Like the previously discussed magnetic assembly 60, magnetic assembly 80 includes a cylindrically-shaped permanent magnet 81 mounted in a steel cup 82. However, unlike the previously described embodiment, the flywheel 28 includes an annular flange 83 secured around a peripheral shoulder 84 by means of mounting screws 85. A plurality of magnetic assemblies 80 (arranged in essentially the same pattern as the assemblies 60 shown in FIG. 3) are mounted around the periphery of the flange 83. For each of the magnetic assemblies 80, another magnetic assembly 86 is mounted in an opening in the adapter plate 26 in opposition thereto. Each such magnetic assembly 86 likewise includes a cylindrical permanent magnet 87 mounted in a steel cup 88 in the manner previously described. The assemblies 86 are uniformly spaced around an offset portion 89 formed around the periphery of the adapter plate 26. In order to bias the contact plate assembly 22 in the position illustrated in FIG. 4, the permanent magnets 81,87 of the assemblies 80,86 are oriented so that like poles confront one another. While the embodiment of the invention illustrated in FIG. 4 requires twice as many magnetic assemblies as the embodiment illustrated in FIG. 2, the biasing force applied to the contact plate 24 diminishes as the plate 24 moves farther and farther into a non-engaging position. Such resiliency characteristics advantageously complement the action of the electromagnetic assembly 104 that pulls the contact plate 24 into an engagement position against the rotor 14, as the attractive force between the plate 24 and rotor 14 increases to a greater extent than the repulsive force between the permanent magnets 81,87 of the magnetic assemblies 80,86 as the contact plate is moved into engagement.

In both of the embodiments of the invention, the electromagnetic assembly 104 includes an electrical coil 105 and a coil support member 106. When the electromagnetic assembly 104 is energized, it attracts the contact plate 24 to the rotor 14, thereby closing the air gap 62 to cause surfaces 64,66 to engage. This in turn allows the input shaft 34 of the diesel motor 30 or other prime mover to transmit its torque the rotor 14 and from thence to the shaft 18 of the driven device 16, which may be a refrigerant compressor. One or both of the surfaces 64,66 may be a high friction surface in order to reduce the chances of slippage when the surfaces are forcefully engaged to one another. Electromagnetic coil 105, which has electrical leads connected to associated electrical controls, is disposed within an annular cavity 107 formed with rotor 14, with coil support member 106 being fixed to a plate 108 via a plurality of bolts 109. In an application of the improved clutch 10 in which driving device is a diesel engine and the driven device 16 is a refrigerant compressor, plate 108 is a compressor seal plate. Shaft 18 is supported by the compressor seal plate 108 via a bearing assembly 110. A shaft seal 111 seals shaft 18 against leakage of refrigerant and compressor oil. Compressor seal plate 108 is fixed to an engine flywheel housing 112 via a plurality of mounting bolts 114. A surface 116 on flywheel housing 112 pilots compressor seal plate 108 to align the output shaft 34 of the diesel engine 30 and the input shaft 18 of the compressor 16.

In the operation of both the embodiments of the electromagnetic clutch 10, when the electromagnetic coil 104 is energized, the contact plate 24 is attracted to the rotor 14, thereby causing the flat major face 64 of the contact plate 24 to engage the flat major face 66 of the rotor 14. The dowel pins 40 illustrated in FIG. 1, and present in both of the embodiments, move axially by the small dimension defined by the air gap 62, with the bushings 42 providing the axial guidance required. In addition to providing such axial guidance, the resiliency of the bushings 42 partially absorb torsional oscillations generated by the diesel engine forming the prime mover 30. The use of magnetic biasing means 58 obviates the need for mechanical components that would undergo stress between the contact plate 24 and rotor 14.

What is claimed:

1. An improved electromagnetic clutch having a rotor rotatable about an axis that is connected to a driven device, a rotatable member connected to a driving device, a contact plate assembly for transmitting torque between said rotatable member and said rotor when moved from a disengagement to an engagement position, and electromagnetic means for axially moving said contact plate assembly into said engagement position, wherein the improvement comprises:

magnetic biasing means for biasing said contact plate assembly into a disengagement position and for allowing said rotatable member to oscillate circumferentially relative to the contact plate assembly in response to torsional oscillations in the driving device.

2. The improved electromagnetic clutch of claim 1, wherein said contact plate assembly is slidably connected to said rotatable member such that it transmits torque from said driving device to said rotor when slidably moved by said electromagnetic means into said engagement position.

3. The improved electromagnetic clutch of claim 2, wherein said magnetic biasing means includes at least one permanent magnet assembly mounted on said contact plate assembly, and a magnetically attractive wall portion of said rotatable member that is in opposition to said permanent magnet assembly.

4. The improved electromagnetic clutch of claim 3, wherein said rotatable member includes a periphery formed from a magnetically attractive material, and said magnetic biasing means includes a plurality of permanent magnet assemblies mounted around a periphery of said contact plate assembly.

5. The improved electromagnetic clutch of claim 3, wherein each permanent magnet assembly includes a permanent magnet, and a cup-shaped member of magnetic material surrounding said permanent magnet.

6. The improved electromagnetic clutch of claim 2, wherein said rotatable member includes a U-shaped periphery that terminates in a flange, and wherein the periphery of said contact plate is disposed within said U-shaped periphery.

7. The improved electromagnetic clutch of claim 6, wherein said magnetic biasing means includes at least one pair of magnetically opposing magnet assemblies, one of which is mounted on said flange of said U-shaped periphery of said rotatable member, the other of which is mounted in the periphery of the contact plate assembly in opposition to said first magnet assembly.

8. The improved electromagnetic clutch of claim 7, wherein said magnetic biasing means includes a plurality of pairs of opposing magnet assemblies mounted around said flange and said periphery, respectively.

9. The improved electromagnetic clutch of claim 7, wherein each permanent magnet assembly includes a permanent magnet, and a cup-shaped member of magnetic material surrounding said permanent magnet.

10. The improved electromagnetic clutch of claim 2, further comprising resilient means for slidably connecting said contact plate assembly to said rotatable member to allow said rotatable member to transfer torque to said contact plate and to oscillate circumferentially relative to the contact plate assembly in response to torsional oscillations in the driving device.

11. An improved electromagnetic clutch having a rotor rotatable about an axis that is connected to a driven device, a rotatable member connected to a diesel internal combustion engine, a contact plate assembly for transmitting torque between said rotatable member and said rotor when moved from a disengagement to an engagement position, said plate assembly being connected to and axially slidably movable with respect to said rotatable member, wherein the improvement comprises:

magnetic biasing means for biasing said contact plate assembly into a disengagement position and for allowing said rotatable member to oscillate circumferentially relative to the contact plate assembly in response to torsional oscillations in the diesel engine.

12. The improved electromagnetic clutch of claim 11, wherein said magnetic biasing means includes at least one permanent magnet assembly mounted on said contact plate assembly, and a magnetically attractive wall portion of said rotatable member that is in opposition to said permanent magnet assembly.

13. The improved electromagnetic clutch of claim 11, wherein said rotatable member has a U-shaped flange that captures the periphery of the contact plate assembly, and said magnetic biasing means includes at least one pair of magnetically opposing magnet assemblies, one of which is mounted on said flange of said U-shaped periphery of said rotatable member, the other of which is mounted in the periphery of the contact plate assembly in opposition to said first magnet assembly.

14. The improved electromagnetic clutch of claim 11, further comprising resilient means for slidably connecting said contact plate assembly to said rotatable member to allow said rotatable member to transfer torque to said contact plate assembly and to oscillate circumferentially relative to the contact plate assembly in response to torsional oscillations in the diesel engine.

15. The improved electromagnetic clutch of claim 11, wherein said contact plate assembly moves along said axis a stroke length of about 0.0050 inches.

* * * * *